J. BODA.
TURN TABLE FOR VEHICLES.
APPLICATION FILED JULY 13, 1907.
903,809.
Patented Nov. 10, 1908.
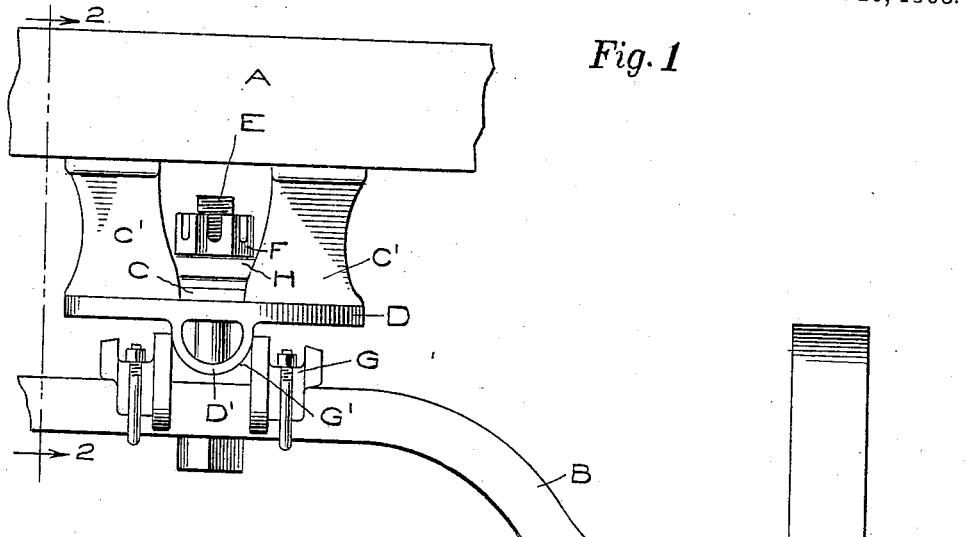
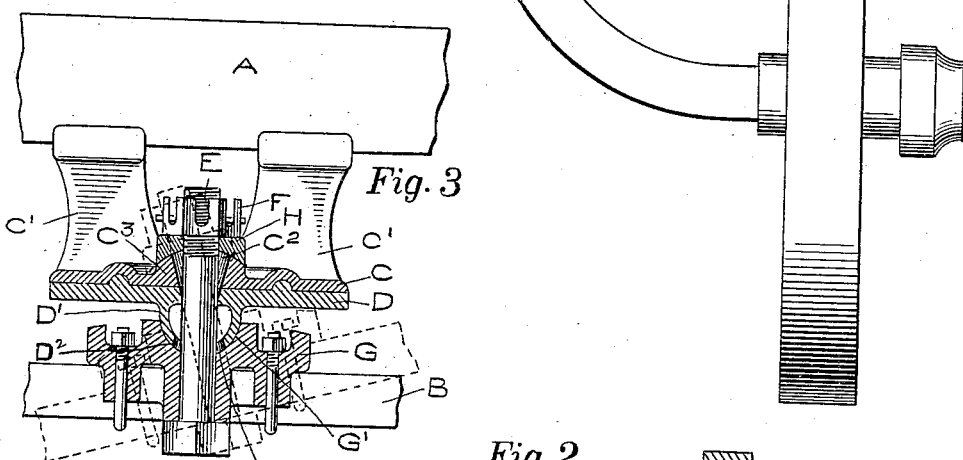
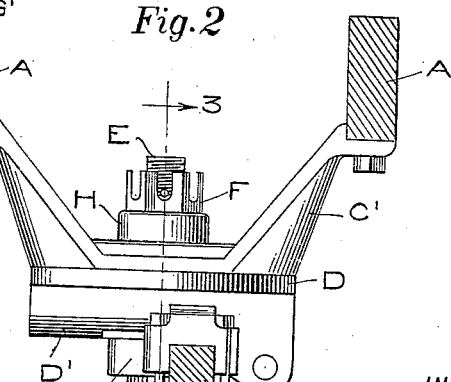
WITNESSES:
John M. Culver.
M. Gertrude Ady
INVENTOR
Joseph Boda
by Burton & Burton
his attys

UNITED STATES PATENT OFFICE.

JOSEPH BODA, OF PLANO, ILLINOIS, ASSIGNOR TO INDEPENDENT HARVESTER COMPANY, OF PLANO, ILLINOIS, A CORPORATION OF MAINE.

TURN-TABLE FOR VEHICLES.

No. 903,809.  Specification of Letters Patent.  Patented Nov. 10, 1908.

Original application filed February 25, 1907, Serial No. 359,104. Divided and this application filed July 13, 1907. Serial No. 383,579.

*To all whom it may concern:*

Be it known that I, JOSEPH BODA, a citizen of the United States, residing at Plano, in the county of Kendall and State of Illinois, have invented new and useful Improvements in Turn-Tables for Vehicles, of which the following is a specification, reference being had to the drawings forming a part thereof.

This application is a division of my application No. 359,104, filed February 25, 1907, for manure spreader.

It relates to the features of construction of the turn-table of the machine shown in said parent application.

The purpose of the invention is to provide improved construction of the turntable for vehicles especially adapted for those of heavy construction, and particularly when the vehicles in question are the frames of traction machines having shafts and other operating parts which should not be subjected to torsion or bending strain liable to be caused by uneven ground, or which for any reason require especially substantial construction in the parts which connect the front axle with the framework of the machine for turning.

It consists of the features of construction shown and described, as indicated in the claims.

In the drawings: Figure 1 is a front elevation of a portion of the axle and front bolster of a vehicle having the turntable devices constituting this invention. Fig. 2 is a section at the line 2—2 on Fig. 1. Fig. 3 is a transverse detail section of the same at the vertical plane of the axis of the king bolt.

In the structure shown in the drawings, A, A are front bolsters of the vehicle framework. B is the front axle which is swiveled to the vehicle frame by means of a turntable and king bolt. The turntable comprises an upper plate, C, and a lower plate, D, secured together by the king bolt, E. The upper plate, C, of the turntable is formed at the lower end of four upwardly diverging bracket arms, $C^1$, upon which are mounted the bolsters, A, A, one upon the two forward of said arms, $C^1$, and the other upon the two rearward thereof, the king bolt, E, extending up between the center of said four arms, between which there is a convenient space for applying to said king bolt a securing nut, F, and other devices hereinafter specified.

One specific purpose of the invention being to provide such range of transverse oscillation of the front axle relatively to the rear axle frame that the frame and mechanism thereon may not be subjected to torsional or bending strain in traveling over uneven ground, the lower plate, D, of the turntable is for this purpose provided with a downwardly extending semi-cylindrical longitudinal boss, $D^1$, for which a correspondingly cylindrically shaped seat is provided at $G^1$ in the upper side of the fitting, G, which is secured to the axle, B, the king bolt aperture, comprising the portion $C^2$, in the plate, C, and the portion, D, in the boss, $D^1$, being as a whole hourglass-shaped, with its narrowest point at the intersection of its axis with the axis of the cylindrical boss, $D^1$, so that the lateral oscillation of the axle in whose fitting, G, the king bolt is definitely held at its lower part, may be accommodated. And for the more perfect action of the joint thus provided, the boss, $C^3$, in which is formed the upper portion of the king bolt aperture, is convexly curved in the arc of a spherical segment at its upper end, and a washer, H, having a correspondingly convex curvature in its lower side seats upon said convex upper end of the boss under the kingbolt-retaining nut, F.

The operation of the structure described will be obvious, as well as the capacity for a range of lateral oscillation of the front axle relatively to the frame, determined by the dimensions of the hourglass-shaped aperture described; and it will be observed also that the provision of the special form of washer, H, in connection with the cylindrical boss and seat of the two parts, D and G, of the turntable, adapts the device to be at all times kept in close-fitted relation while still remaining adapted for the necessary oscillation and swiveling.

I claim:—

1. In combination with a vehicle frame, a swiveled axle therefor; turntable plates, and a king bolt extending therethrough, axially fixed with respect to the axle; a fitting on the axle upon which the lower turntable plate is lodged, said fitting and plate having one a cylindrical boss and the other a cylindrically shaped seat for such boss extending transversely of such axle; the upper turntable plate having on its upper surface an annular spherically convex boss about the king bolt aperture and a washer having a spherically concave face seating on said spherical boss.

2. In combination with a vehicle frame, a swiveled axle therefor, turn-table plates, a king-bolt and a fitting on the axle, said fitting and the lower turn-table plate having one a half cylindrical boss, and the other a correspondingly shaped seat for said boss extending transversely of the axle, the king-bolt extending through the turn table plates and axle fitting and retaining said parts in their respective pivotal relations to each other, the king-bolt aperture being formed through said boss and being hour-glass shaped with its neck at the horizontal plane of the axis of the cylindrical boss.

3. In combination with a vehicle frame, a swiveled axle therefor; turntable plates and a king bolt constituting the swivel connection of the axle to the frame; a fitting on the axle having a transverse cylindrically concave seat, the lower turntable plate having a semi-cylindrical boss fitting said seat, the king bolt aperture being formed through said boss and being hourglass-shaped with its neck at the horizontal plane of the axis of the cylindrical boss.

4. In combination with a vehicle frame, a swiveled axle therefor; turntable plates and a king bolt constituting the swivel connection of the axle to the frame; a fitting on the axle upon which the lower turntable plate is lodged, said fitting and plate having one a cylindrical boss and the other a cylindrically shaped seat for such boss extending transversely of such axle, the king bolt aperture being formed through said boss and its seat, the upper plate of the turntable having an annular spherically convex boss about the king bolt aperture and a head or cap washer on the king bolt having a spherical concave face fitting such boss.

5. In combination with a vehicle frame, a swiveled axle therefor; turn-table plates and a king-bolt axially fixed with respect to the axle; a fitting on the axle upon which the lower turn-table plate is lodged, said fitting and plate having one a cylindrical boss and the other a cylindrically shaped seat for such boss extending transversely of such axle, the king bolt having a head at its lower end, and being adapted to be inserted upwardly through the parts which it connects and having its upper end threaded for a nut; the upper turn-table plate having on its upper surface an annular spherically convex boss about the king bolt aperture; a washer, fitting and seated on said boss and a removable nut on the bolt above the washer.

In testimony whereof, I have hereunto set my hand this 28th day of June, A. D., 1907.

JOSEPH BODA.

Witnesses:
EDWARD T. WRAY,
M. GERTRUDE ADY.